Nov. 13, 1928.
H. S. JANDUS
1,691,885
BUMPER SUPPORTING MEANS
Filed Sept. 7, 1926
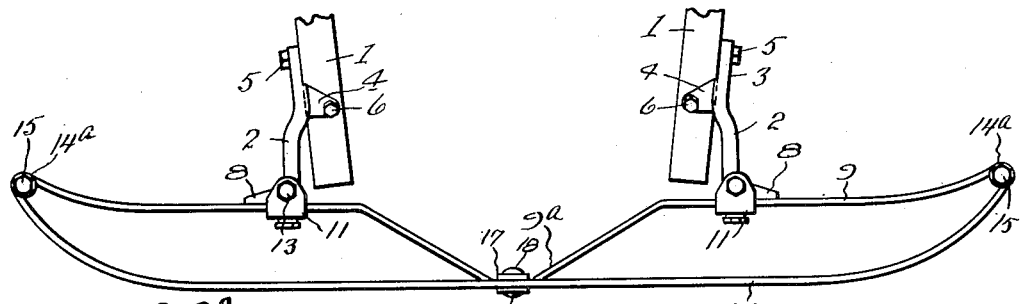
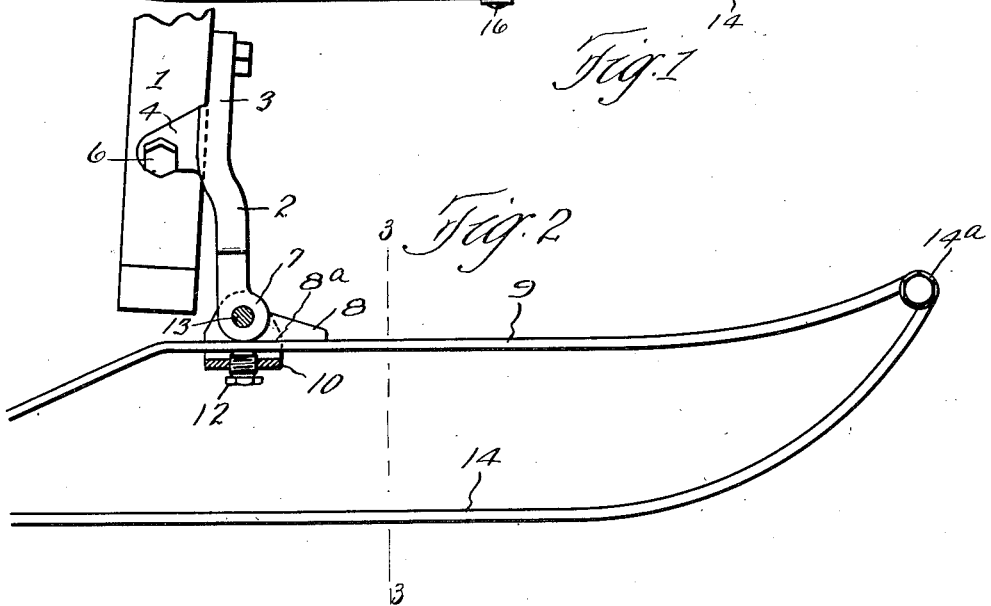
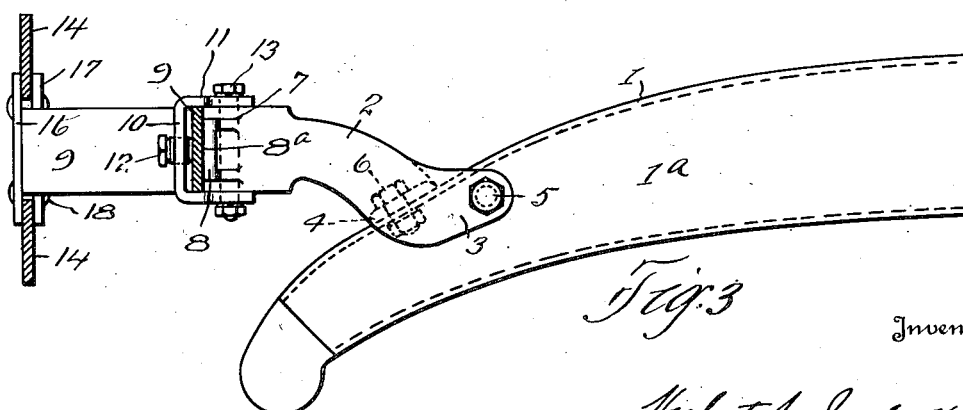
Inventor
Herbert S. Jandus,
By Hull, Brock & West,
Attorneys Patented Nov. 13, 1928.

1,691,885

UNITED STATES PATENT OFFICE.

HERBERT S. JANDUS, OF DETROIT, MICHIGAN, ASSIGNOR TO THE C. G. SPRING AND BUMPER COMPANY, OF DETROIT, MICHIGAN, A CORPORATION OF DELAWARE.

BUMPER-SUPPORTING MEANS.

Application filed September 7, 1926. Serial No. 134,051.

This invention relates to bumpers such as are used with automobiles and more particularly to the means whereby such bumpers are supported from the frames of such vehicles.

The usual manner of so supporting bumpers from automobile frames is to provide arms or brackets secured to the frame and projecting therefrom, with means for clamping or securing the bumper to such arms. It has been found advantageous to provide such arms each with a vertically arranged eye at the outer end thereof, securing the bumper to such eye by means of a clamp embracing a bar of the bumper and having its rear or inner end pivotally connected to the eye on the corresponding arm by means of a pivot bolt. The invention herein relates to a pivotal mounting of the type referred to but has for its general object to provide a support of this character which has special advantages in the matter of reinforcing the outer ends of the bumpers when under impact, as well as to provide additional resistance for the outer ends of bumpers where the pivotal supports are somewhat close together.

I accomplish this object in and through the construction and arrangement of parts shown in the drawing, wherein Fig. 1 represents a plan view of a bumper, showing the same supported from the ends of the side members of an automobile by means of my invention; Fig. 2 a detail in plan of a part of the bumper and its frame member and supporting arm, the top arm or member of the clamp being broken away; and Fig. 3 a detail corresponding substantially to the line 3—3 of Fig. 2.

Describing the parts by reference characters 1, 1 denote the ends of the side members of a vehicle frame. These side members are preferably channeled, and each has secured thereto a bracket or arm, indicated generally at 2, each such bracket or arm being preferably a casting having a face 3 adapted to bear against the vertical web 1ª of the frame member and a horizontally extending flange 4 adapted to bear upon the top flange of the said member, the parts 3 and 4 being secured to the appropriate frame member by bolts 5 and 6, respectively. For convenience of description, the bumper will be assumed as applied to the front ends of the members 1, and the terms "front" and "rear" will be used hereinafter to identify the relative location of the parts, but without limiting the use of my invention to bumpers applied only to the fronts of automobiles.

Each of the arms 2 has at its front or outer end a vertical eye 7 from which there extends a lug 8. The arms or brackets 2 are arranged to be clamped to the frame members 1 in such manner that the lugs 8 will extend outwardly from their respective eyes 7, each lug having a flat extended front face 8ª which is in the plane of the front of the eye 7 and which forms an extended bearing surface along the rear face of the plate or bar 9 of the bumper to which it is secured. Each arm 2 is preferably connected to the appropriate bumper bar or plate 9 by means of a U-shaped clamp, the same having a vertical web 10 and rearwardly extending horizontal arms 11 which are adapted to receive therebetween the bar 9 and the eye 7 on the adjacent arm or bracket 2. A heavy set-screw 12 is threaded through the web 10 so as to force the bar 9 against the eye 7 and the front face of the lug 8.

The clamps 10, 11 are pivotally secured to the arms 2 by means of bolts 13 extending through apertures in the flanges 11 and through the eyes 7.

The bumper which is suported from the arms or brackets 2 may be of any ordinary or standard construction. The one shown herein is of the general type shown in patent to McGregor No. 1,372,154, issued March 22, 1921, and comprises a pair of vertically spaced front or impact bars 14 having eyes 14ª at their ends. The bar 9 is the rear or auxiliary bar of the bumper and is provided at each end thereof with an eye which is inserted between the verticaly spaced eyes 14ª on the bars 14 and connected thereto by means of a bolt 15. The bar 9 is provided with a central V-shaped portion 9ª which is projected toward and between the bars 14 and is secured to said bars 14 by means of front and rear clamping plates 16 and 17 and connecting bolts or rivets 18.

It will be evident that, when the bumper receives an impact on the outer portion thereof—outside of the supporting arm or bracket 2—such outer portion or end will be deflected, or will tend to be deflected, rearwardly or toward the body of the vehicle. This tendency to deflection will be resisted by the outwardly extending lugs 8. Thus, while not losing the benefits due to pivotally mounting the bumper upon the arms or brackets 2, the bumper end will not be deprived of additional support where such support is necessary—as, for instance, when the members 1 or the pivotal supports 13 are more than ordinarily close together. While the construction shown herein will accomplish this result it also will not interfere with the proper pivotal action of the clamping and supporting members when the central part of the bumper is subjected to impact.

It is further apparent that if it is desired to reinforce the bumper on the inner side of the support arms 2 the lugs 8 could be extended inwardly as well as, or instead of, outwardly from the point of attachment of the bumper bar to the support arm.

Having thus described my invention, what I claim is:

1. The combination, with a bumper bar, of a pair of supporting arms or brackets, and means pivotally connecting the said bumper bar to the said arms or brackets, the said arms or brackets having each a lateral extension adapted to engage the adjacent face of the bumper bar and form an extended bearing therefor.

2. The combination, with a bumper bar, of a pair of supporting arms or brackets each having an eye at the outer end thereof, and clamping means for pivotally securing the said bar to the eyes on the said arms or brackets, each arm or bracket having an outwardly projecting extension forming an elongated or extended bearing against the adjacent face of the bar.

3. The combination, with a bumper bar, of a pair of supporting arms or brackets each having an eye at the outer end thereof, and clamping means for pivotally securing the said bar to the eyes on the said arms or brackets, each arm or bracket having an extension providing an elongated or extended bearing against the adjacent face of the bar and in substantially the plane of the front of the eye on such arm or bracket.

4. The combination, with a bumper bar, of a pair of supporting arms or brackets each having an eye at its front or outer end and a lug extending from such eye toward the adjacent end of the bumper bar, each lug having a bearing face extending from the front face of the eye at substantially right angles to the arm or bracket, a pair of clamps, one for each arm or bracket and each having a front web and rearwardly extending legs, bolts pivotally connecting the legs of said clamps to the respective eyes of the arms or brackets, and a clamp screw threaded to the web of each clamping member and forcing the bumper bar against the front of the co-operating eye and lug.

5. The combination, with a bumper bar, of a pair of supporting arms or brackets each having an eye at its front or outer end and a lug extending laterally from such eye, each lug having a bearing face extending from and in substantially the plane of the front face of the eye, a pair of clamps, one for each arm or bracket and each having a front web and rearwardly extending legs, and means pivotally connecting the legs of said clamps to the respective eyes of the arms or brackets with the rear face of the bar in contact with said eyes and bearing faces.

6. The combination, with a bumper bar, of a support arm therefor, said arm having an eye in its outer end portion and having a lateral extension adapted to engage the adjacent face of the bumper bar and provide an elongated or extended bearing therefor.

7. The combination, with a bumper bar, of a support arm or bracket having an eye at the outer end thereof and a lateral extending projection forming an elongated or extended bearing against the adjacent face of the bar, and clamping means for pivotally securing the said bar to the said arm or bracket.

8. The combination, with a bumper bar, of a supporting arm or bracket having an eye at the outer end thereof and an extension providing an elongated or extended bearing against the adjacent face of the bar and in substantially the plane of the front of the eye on such arm or bracket, and means for pivotally clamping the said bar to the said arm or bracket.

9. The combination, with a bumper bar, of a support arm or bracket, said arm or bracket having an eye at its front or outer end and a laterally extending lug having a bearing face extending from and in substantially the plane of the front face of the said eye, and a pivot clamp adapted to hold said bar in engagement with the front or outer end of said arm or bracket.

In testimony whereof, I hereunto affix my signature.

HERBERT S. JANDUS.